Dec. 26, 1961     A. S. KNAPP     3,014,419
ELECTRIC TOASTERS
Filed Aug. 4, 1958
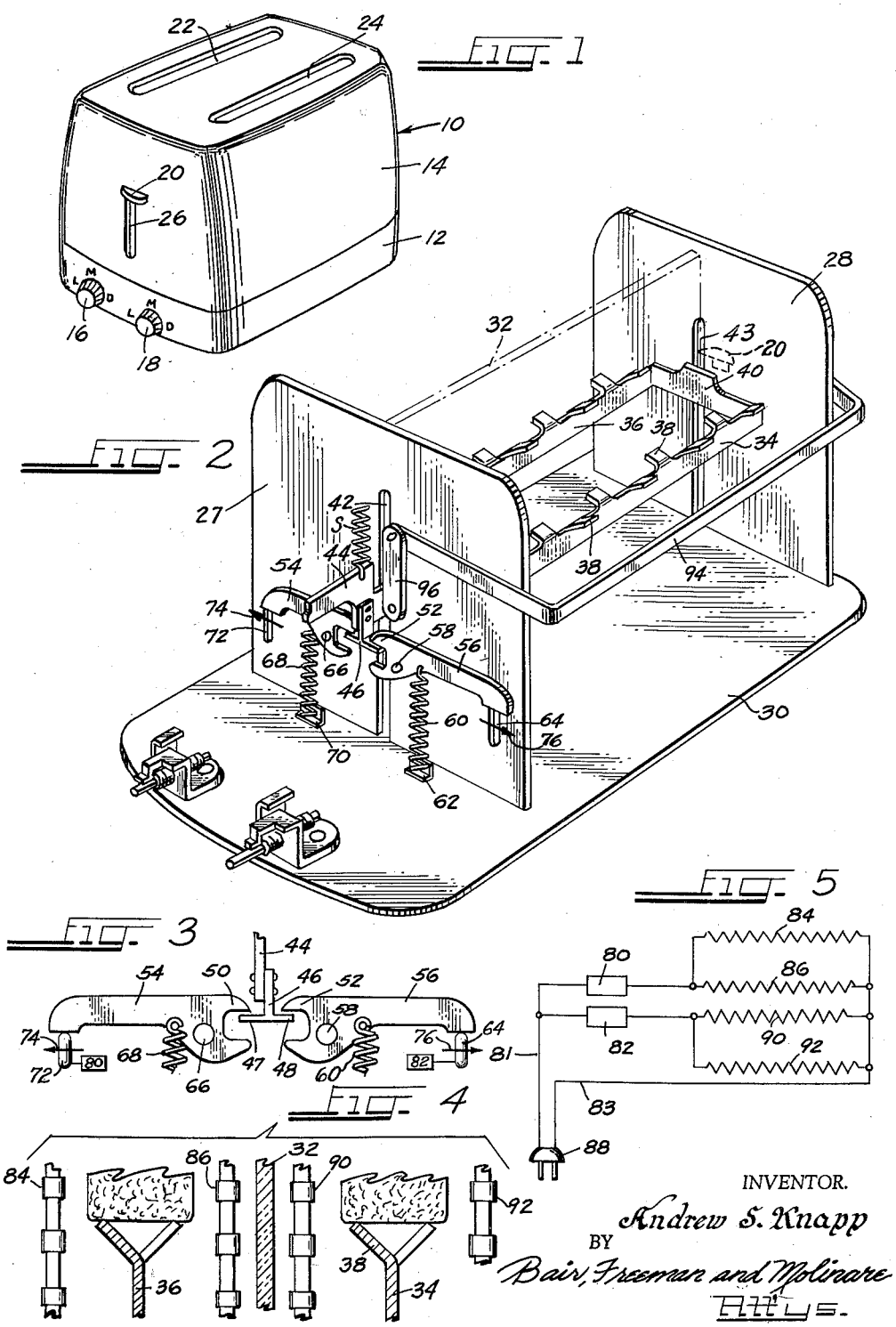
INVENTOR.
Andrew S. Knapp
BY
Bair, Freeman and Molinare
ATTYS.

United States Patent Office 3,014,419
Patented Dec. 26, 1961

3,014,419
ELECTRIC TOASTERS
Andrew S. Knapp, St. Louis, Mo., assignor to Knapp-Monarch Company, St. Louis, Mo., a corporation of Delaware
Filed Aug. 4, 1958, Ser. No. 752,781
4 Claims. (Cl. 99—327)

This invention relates to improvements in electric toasters and more particularly to improvements in electric toasters having individual color control means for the bread to be toasted at each side of the toaster.

In my co-pending application, Serial No. 599,201, filed July 20, 1956, now abandoned, there is disclosed a portable home electric toaster of the type adapted to toast a plurality of bread slices and having means for controlling the degree of toasting or color of each separate slice. In addition to the separate color controls, the toaster there discolsed is characterized by the provision of an individual bread carrier for each bread slice so that at the end of the toasting time for each bread slice, its particular carrier is released to lift the toasted slice of bread into position to be removed.

The present invention is an improvement over the invention disclosed in my above-identified co-pending application in that a single bread carrier assembly is utilized to transport all of the bread slices, while still permitting each side of the toaster to have an individual color control and separate heating elements. Thus, in accordance with the features of the present invention, a plural slice toaster, adaptable for home use, provides individual, selective, toasting for the bread at each side of the toaster but requires only a single bread platform, which platform is not released until all of the timing switches for the toasted slices have timed out.

Accordingly, it is a general object of this invention to provide a new and improved electric toaster having a single bread carrier assembly for a plurality of bread slices and an individually settable toast color control for the bread at each side of the toaster.

It is a further object of this invention to provide a new and improved electric toaster, as described above, wherein the bread at each side is provided with a pair of separately energizable heating elements which do not affect the color of adjacent bread slices at the other side of the toaster.

It is another object of this invention to provide a new and improved electric toaster, as described above, having a single bread carrier assembly for a plurality of bread slices and having manually actuatable means at each end of the bread carrier assembly for enabling it to be operated from either end of the toaster housing.

It is still another object of this invention to provide a new and improved electric toaster, as described above, which is characterized by its flexibility of use and its economy of construction, making it readily adaptable for home use.

With these and other objects in view, the invention consists in the construction, arrangement and combination of the various parts of the novel electric toaster whereby the objects contemplated are attained as hereinafter set forth.

The various features of novelty which characterize the invention are pointed out with particularity in the claims annexed to and forming a part of this specification. For a better understanding of the invention, however, and its advantages, reference is had to the accompanying drawing and descriptive matter in which is shown and described an illustrative embodiment of the invention.

In the drawing:

FIGURE 1 is a perspective view of a plural control electric toaster having a single bread carrier assembly embodying the invention;

FIGURE 2 is a fragmentary perspective view, partially broken away, of the plural toast chambers and unitized platform assembly in accordance with the invention;

FIGURE 3 is a further view of the novel latching mechanism embodied in the invention;

FIGURE 4 is a fragmentary end view of the plural toast chambers with the bread slices positioned on the bread carrier assembly; and FIGURE 5 is a schematic diagram of the heating element circuit utilized in the toaster.

Referring now to the drawing, and more particularly to FIGURE 1 thereof, there is disclosed an illustrative embodiment of an electric toaster having a single bread carrier assembly and plural color control means in accordance with the invention. Although this invention is particularly described as a toaster adapted for toasting two bread slices, it will be apparent that the description is equally applicable to toasters adapted for handling greater numbers of slices, such as a four slice toaster, and that the two slice embodiment is merely exemplary of the uses to which the invention may be put.

As shown in FIGURE 1, the toaster 10 comprises a toaster base frame 12, a housing 14 supported by base frame 12, a pair of toast color control knobs 16 and 18, and at least one bread carrier operating handle 20. As explained in greater detail below, two bread carrier operating handles may be provided, one at each end of the single bread carrier assembly.

The housing 14 has formed therein a pair of bread receiving and dispensing slots, 22 and 24, positioned in parallel relation at the top surface of the housing. One end wall of housing 14 is provided with a single, elongated, vertical guide slot 26 which is adapted to accommodate the bread carrier operating handle 20, and in accordance with a feature of this invention, the other end wall also may similarly be provided with a single, elongated, vertical guide slot to accommodate a further bread carrier.

In accordance with a specific feature of this invention, the two toast color controls 16 and 18 are arranged in operative association with each bread carrier operating handle 20 to the end that the bread at each side of the toaster may be individually controlled with regard to toasting color, and further that all of the bread slices may be raised and lowered by means of a common bread carrier assembly. Advantageously, the toast color control 16 is associated with the bread receiving and dispensing slot 22 and is adapted to be adjusted over a continuous range of positions, which range may be conveniently defined by the marks L, M, and D on the base frame 12—to designate the approximate positioning of the control switch 16 required to produce light, medium and dark slices of toast respectively. Similarly, the toast color control knob 18 may be positioned with respect to its color designations of L, M, and D to control the color of toasting for the bread slice placed in the slot 24.

FIGURE 2 shows in fragmentary form the construction of the individual toasting chambers and carriers embodied within the housing 14 of the FIGURE 1. Those parts of the toaster which are well known in the art have not been shown in detail in FIGURE 2 for the purpose of pointing out with greater particularity the features of novelty of the instant invention and for facilitating the understanding thereof.

The individual toasting chambers for the bread slices are defined by a pair of end plates, such as the front end plate 27 and the back end plate 28, supported in parallel spaced relation by the base plate 30. Advantageously, the electric coil heating members of the two toasting chambers are isolated from each other by an insulating wall 32, shown in broken line form in FIGURE 2, and shown in greater detail in FIGURE 4 of the drawing.

Insulating wall 32 serves to prevent heat of the heating elements in one toasting chamber from affecting the toasting of a slice of bread in the other chamber, and therefore, the insulating wall 32 is formed of any efficient insulating material such as asbestos, mica and the like.

Each chamber is provided with a bread carrier, and these are shown in the illustrative embodiment of FIGURE 2 as the bread carriers 34 and 36. Each bread carrier is formed with a plurality of bread supporting bars 38 alternately extending from opposite sides of the carrier along its length.

In accordance with a further feature of this invention, the two bread carriers 34 and 36 are joined by the connecting cross pieces 40 so as to form a unitized bread carrier structure adapted to be actuated by a single operating member. Cross piece 40 at one end thereof extends through a slot 43 in the back end plate 28 and at the other end thereof cross piece 40 extends through a slot 42 in the front end piece 27 and is connected thereat to an elongated bracket 44, which is adapted at its remote end to support the handle 20. Bracket 44 also is supportingly secured to a substantially T-shaped tab support 46. As shown in greater detail in FIGURE 3 of the drawing, the tab support 46 is provided with a pair of horizontal, oppositely extending tabs 47 and 48, which are adapted to cooperate in latching relation with the hooks 50 and 52 of the latch levers 54 and 56, respectively.

Latch lever 56 is pivotally connected to end plate 26 by means of the pivot pin 58 and a coil spring 60 is connected between latch lever 56 and bracket 62 on the base plate 30. Coil spring 60 exerts a pulling force on a latch lever 56, and the latter normally is held from rotation by means of a rigid, elongated lock member 64 which extends forwardly of the end piece 27, and which is adapted to be moved in a horizontal direction to control the operation of the latch lever 56. Thus, it can be seen that when the latch lever 56 is released by the outward horizontal movement of the lock member 64 in the direction of arrow 76, the coil spring 60 causes the latch lever 56 to be rotated in a clockwise direction, as shown, about the pivot pin 58 to remove the hook 52 from the tab 48 of the tab support 46. Similarly, latch lever 54 is pivotally secured to the end plate 27 by the pivot pin 66 and a coil spring 68 is operatively positioned between the latch lever 54 and the bracket 70 on the base plate 30 in a manner similar to that described heretofore with respect to latch lever 56. Latch lever 54 normally is held from rotation by means of a rigid elongated lock member 72 which extends forwardly of the end piece 27 and which is adapted to be moved in a horizontal direction to control the operation of the latch lever 54. Thus, when the lock member 72 is moved outwardly in the direction of arrow 74 the coil spring 68 pivots the latch lever 54 in the counterclockwise direction, as shown, about the pivot pin 66 to remove the hook 50 from the tab 47 of the tab support 46. Those skilled in the art will appreciate that the lock members 64 and 72 may be pivoted outwardly at the end of the toaster timing cycle by any suitable mechanism associated with the timing switch means 82 and 80, respectively, as for example, the impact release mechanism shown in the patent to Charles D. Visos, Patent No. 2,778,902.

Those skilled in the art will readily appreciate that conventionally a coil spring may be secured between the bracket 44 and the top of the end plate 27 so that the bread carriers 34 and 36 are normally urged upwardly by the spring to its upper limiting position as defined by the slot 42. Since this coil is conventional, it has not been illustrated to simplify the drawing and to facilitate the explanation of the novel features thereof.

It now can be seen that in the operation of the toaster, a slice of bread is inserted through the slot 24 of housing 14 to rest upon the bars 38 of the bread carrier 34, and a slice of bread is inserted through slot 22 to rest upon the bars 38 of the carrier 36. The handle 20 at either end of cross piece 40 then is manually actuated to depress the bread carriers 34 and 36 to their lower limiting position. In accordance with a feature of this invention, the latch levers 54 and 56 are provided with the hooks 50 and 52 respectively, such that when the carriers 34 and 36 are depressed to their lower limit position, they are maintained in this position by virtue of the latching action of hook 50 on tab 47 and hook 52 on tab 48.

In accordance with this invention, the latch levers are maintained in locking position until both slices of toast have been toasted to their individually selected toasting color by means of the lock members 64 and 72 which in turn are controlled by the timing switch means 80 and 82 shown in FIGURE 5 of the drawing. A first pair of heating elements 84 and 86, arranged to individually toast the slice of bread on bread carrier 36, is connected in series with timer switch means 80 between the conductors 81 and 83 connected to power plug 88. Similarly, heating elements 90 and 92, arranged for toasting the bread slice on bread carrier 34 are connected in series with timer switch means 82 between the conductors 81 and 83. It will be noted that each pair of heating elements and its respective timing switch means are connected in parallel with the other pair of heating elements and timing switch means and accordingly, the heating element pairs are independently energizable.

The construction of the timing switch means is well known in the art, and accordingly, a showing of its details is not necessary. However, it will be appreciated that both timing switch means 80 and 82 may be of the type which permits the flow of current therethrough to the respective heating elements when the timing switch means is actuated by the depression of bracket 44 to lock the bread carriers 44 and 46 in toasting position.

It also will be appreciated that as timing switch means times out, its associated heating elements are de-energized, and further, the lock member associated therewith is moved outwardly in the direction of the arrows 64 or 74 to release its latch lever. Such timing switch means are well known in the prior art as shown for example, in the application, Serial No. 539,481, filed October 10, 1955, Charles D. Visos, now Patent No. 2,778,902, issued January 22, 1957.

When both timing switch means 80 and 82 have timed out, and their associated latch levers are released, the tab support 46 is unlocked, and bracket 44, together with the bread carriers 34 and 36, are raised to the upper operating position for permitting the toasted bread slices to be removed.

Due to the unique double lock operation of the latch levers and the tab support, those skilled in the art will readily appreciate that the bread carriers will not be raised to their upper positions until both toasting periods have come to an end, as determined by the settings of the control knobs 16 and 18. To facilitate the action of the bread carriers 34 and 36, it may be advantageous to provide a U-shaped equalizing lever, such as the lever 94, which is connected to bracket 44 by means of cross members 96 at both the front and back end plates It will be readily understood that the U-shaped equalizing lever 94 serves to maintain the bread carriers 34 and 36 level during their vertical movement by providing a balancing or equalizing movement in opposition thereto. Thus, as the bread carriers are lowered the equalizing lever is raised, and vice versa. Such equalizing levers are well-known in the toaster art, as shown for example by Patent No. 2,546,662, issued March 20, 1951.

Further, it will be readily understood that the provision of bread carrier operating handles 20 at each end of the bread carrier assembly, in accordance with the features of one alternative embodiment of the invention, permits the toaster to be operated from either end of the toaster housing. Thus, persons sitting at opposite ends of a table, for example, advantageously may selectively operate the toaster to obtain individually controlled slices of toast.

It will be appreciated by those skilled in the art that modifications may be made in the construction and arrangement of the parts of the above-described toaster without departing from the real spirit and purpose of the invention, and that it is intended to cover by the appended claims any modified forms of structure or use of mechanical equivalents which may reasonably be included within their scope.

What is claimed as the invention is:

1. A multi-slice electric toaster comprising a housing having positioned therewithin a plurality of groups of separately energizable heating coils, there being one group of two coils for each side of the toaster, a separate control circuit for energizing and de-energizing each group of heating coils, each control circuit including an adjustable multi-position toast color control for enabling the toasting color of the bread at each side of the toaster to be individually preset, a unitized bread carrier assembly having a separate carrier for moving the bread at each side into and out of toasting position with respect to its associated heating coils, a single, manually operable bracket operatively linked to said bread carrier assembly adapted when depressed to move all carriers into toasting position and, when released, to move all carriers out of toasting position, and a plurality of latch means, one for each control circuit, for securing said bread carrier assembly in toasting position when the bracket is depressed, each of said latch means being released and its control circuit de-energized when its bread has attained the preset toasting color, said bread carrier assembly being released to lift all the bread slices out of toasting position only after all of the latch means have been released and all of the bread slices have been toasted to their preset colors.

2. A multi-slice electric toaster comprising a housing, said housing being formed with at least one bread slice receiving opening at each side of the toaster, a separate control circuit for the bread at each side including an individually adjustable multi-position toast color control for enabling the color of the bread at each side of the toaster to be individually preset, a unitized bread carrier assembly having a separate carrier for moving each bread slice into and out of toasting position, and at least one manually operable bracket for said bread carrier assembly adapted when depressed to move all platforms into toasting position, and when released, to move all platforms out of toasting position.

3. A multi-slice electric toaster in accordance with claim 2 further comprising a plurality of latch means, one for each control circuit for securing said bread carrier assembly in toasting position when the bracket is depressed, each of said latch means being released when its bread has attained the preset toasting color, said bread carrier assembly being released to lift all the bread slices out of toasting position only after all of the latch means have been released and all of the bread slices have been toasted to their preset colors.

4. A multi-slice electric toaster in accordance with claim 2 wherein said housing is formed with a guide slot at each end thereof, and said unitized bread carrier assembly has an extension at each end adapted for movement within one of said guide slots, and further comprising a manually operable bracket attached to each extension for enabling said bread carrier assembly to be moved into toasting position from either end of said housing.

References Cited in the file of this patent

UNITED STATES PATENTS

| | | |
|---|---|---|
| 1,394,450 | Strite | Oct. 18, 1921 |
| 1,560,578 | Hummel | Nov. 10, 1925 |
| 1,682,683 | Parodi | Aug. 28, 1928 |
| 2,624,267 | Olson | Jan. 6, 1953 |